May 29, 1962  J. FEINMAN  3,036,440
METHOD OF COOLING BRIQUETTES OF IRON PARTICLES
Filed Feb. 3, 1960
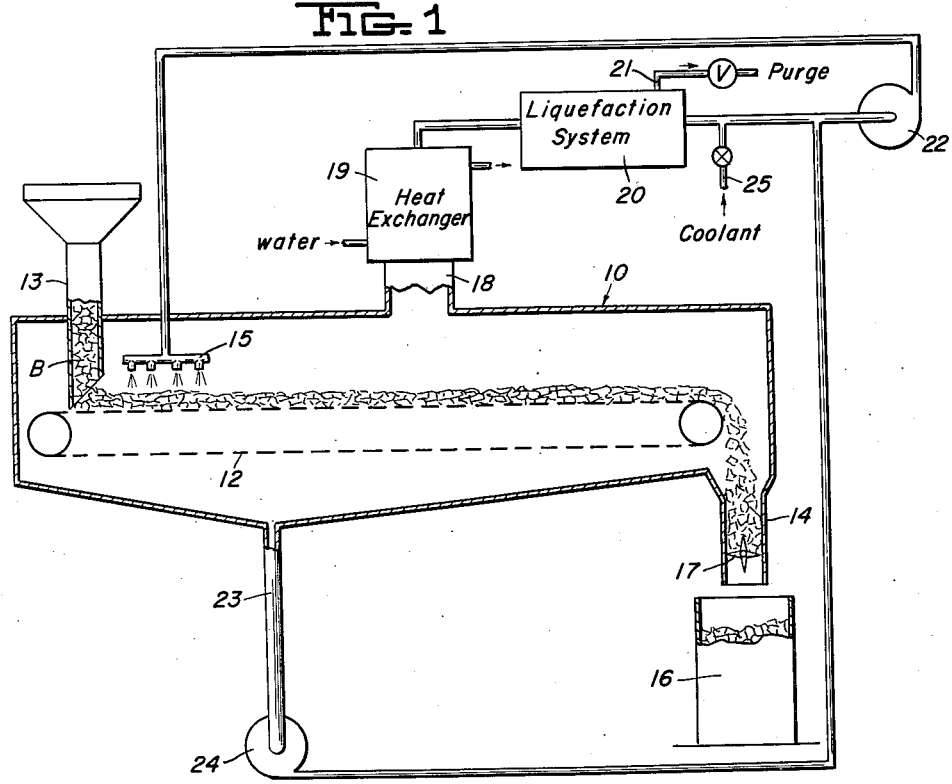
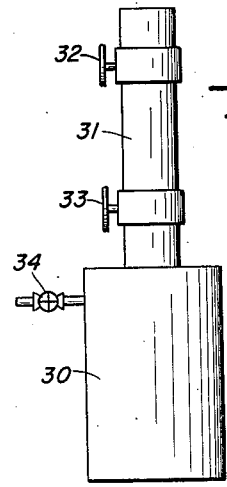
INVENTOR
JEROME FEINMAN
By Donald G. Dalton
Attorney United States Patent Office 3,036,440
Patented May 29, 1962

3,036,440
METHOD OF COOLING BRIQUETTES OF IRON PARTICLES
Jerome Feinman, Pitcairn, Pa., assignor to United States Steel Corporation, a corporation of New Jersey
Filed Feb. 3, 1960, Ser. No. 6,548
3 Claims. (Cl. 62—64)

This invention relates to an improved method of cooling briquettes of freshly reduced iron particles.

Commonly the product obtained by direct reduction of iron oxide fines is briquetted while still hot. Initially the briquettes are at a temperature as high as about 1300 F., at which they are readily reoxidized; hence they must be cooled in a way that prevents reoxidation before they can be safely stored and handled. Previously they have been cooled by direct quenching in water or fuel oil or in an inert atmosphere, such as nitrogen, but each of these cooling methods has disadvantages. A water quench tends to oxidize the briquette surfaces and thus adversely affects the quality of the final product. Fuel oil has only a limited capacity for removing heat, since little of it vaporizes. Furthermore it is expensive, since not all the oil can be recovered. The use of an inert gas requires large and costly apparatus to produce and handle the necessary volumes of gas. The coefficient of heat transfer by convection is low, and inert-gas cooling does not take advantage of the considerable cooling effect obtained when a liquid coolant vaporizes.

An object of the present invention is to provide an improved cooling method which overcomes disadvantages of previous methods, that is, which cools briquettes rapidly and efficiently yet effectively prevents reoxidation without adversely affecting the product.

A more specific object is to provide an improved cooling method which utilizes the heat of vaporization of a volatile liquid coolant for extracting heat from iron powder briquettes, in addition to raising the temperature of the coolant.

My cooling method involves continuously contacting hot briquettes of freshly reduced iron powder with an effectively stable, readily volatilized liquid coolant which is inert to iron particles under the conditions encountered. Examples of suitable coolants are ammonia and low boiling saturated or aromatic hydrocarbons, such as propane, butane, hexane, heptane, benzene, or toluene, or mixtures thereof. I spray or otherwise bring cold liquid coolant into intimate contact with the briquettes, which are initially at a temperature of about 900 to 1300 F. Liquid coolant in contact with the briquettes vaporizes rapidly. Heat consumed in vaporizing the coolant comes from the briquettes, which quickly cool to an average temperature of about 200 to 300 F. At this temperature they do not reoxidize when exposed to air, they do not retain any liquid coolant, and they can be handled safely. I recover the coolant vapors and cool and liquefy them for re-use. If there is some slight decomposition of the coolant, I can purge the decomposition products after I liquefy the remaining coolant. I continuously supply a small amount of additional coolant to the system to make up for that lost through leakage or decomposition.

In the drawing:
FIGURE 1 is a diagrammatic layout of an apparatus for performing my cooling method; and
FIGURE 2 is a side elevational view of a laboratory apparatus I have used for demonstrating my method experimentally.

The apparatus illustrated in FIGURE 1 comprises an enclosed cooling chamber 10, a power driven conveyor 12 housed within the chamber, a feed chute 13, and a discharge chute 14. Hot freshly formed briquettes B feed continuously from chute 13 to the entry end of conveyor 12. A spray device 15, per se of conventional construction, is supported in chamber 10 over conveyor 12 immediately beyond chute 13. I continuously spray cold liquid coolant over the briquettes through this spray device. I maintain a pressure slightly above atmospheric within the chamber to exclude air. The cooled briquettes discharge from the opposite end of the conveyor through chute 14 into a suitable receiver 16. Chute 14 contains a star feeder 17 or the like to minimize loss of coolant with the briquettes.

Most of the coolant of course vaporizes, and the vapors leave the chamber through an outlet 18 at the top. These vapors pass through a heat exchanger 19 and a liquefaction system 20, both per se of conventional construction. The liquefaction system has an outlet 21 for purging any gaseous products which result from decomposition of the coolant. Liquefied coolant goes to the intake side of a pump 22, which returns it to the spray device 15. A minor portion of the coolant may remain unvaporized in chamber 10. Unvaporized coolant leaves the bottom of the chamber through a drain 23 and passes into the intake side of a pump 24, which returns it to the intake side of pump 22. Make-up coolant is introduced to the intake side of pump 22 through an inlet pipe 25.

To demonstrate the operability of my cooling method I conducted tests in an apparatus constructed as shown in FIGURE 2. This apparatus includes a cylindrical vessel 30, a pipe 31 extending upwardly from the vessel, spaced apart upper and lower cocks 32 and 33 in the pipe, and a pressure tap 34 connected to the side wall of the vessel. In each test I introduced coolant to the vessel through the pipe and closed the lower cock. Next I inserted briquettes of hot iron powder in the pipe, closed the upper cock and opened the lower. The hot briquettes thus dropped into the coolant in the vessel.

*Example 1*

In a test conducted in the foregoing manner, I introduced about 0.6 pound of anhydrous liquid ammonia to vessel 30. Since ammonia has a vapor pressure of about 120 p.s.i. at room temperature, the apparatus was self-purging. I introduced three briquettes of 0.27 pound total weight and at a temperature of 1300 to 1400 F. After the briquettes cooled, I withdrew a vapor sample through the pressure tap 34 for analysis. This sample contained 0.26 mol percent $H_2$. Calculations show that no more than about 0.006 percent of the vaporized ammonia decomposed, which is equivalent to about 0.0002 pound $NH_3$ per pound of briquettes cooled. The briquettes cooled in this test displayed no cracks or other detrimental effects chargeable to the ammonia quench.

*Example 2*

In another test I introduced about 0.5 pound of hydrocarbon (benzene) to vessel 30 and purged the apparatus with nitrogen. I introduced three briquettes of 0.22 pound total weight and at a temperature of 1300 to 1400 F., and allowed the apparatus to cool to its initial temperature. I attached a manometer to the pressure tap 34 and observed a permanent pressure increase of 3 inches of water. The permanent pressure increase is directly proportional to the total amount of hydrocarbon decomposed, since decomposition produces noncondensable hydrogen. Calculations show that no more than about 0.078 percent of the vaporized hydrocarbon decomposed, which is equivalent to about 0.00035 pound of hydrocarbon per pound of briquettes cooled. Again the cooled briquettes were in satisfactory condition.

From the foregoing description, it is seen that my invention affords a simple effective method of cooling briquettes of hot iron powder from their finishing temperature to a temperature at which they can safely be handled. My method largely overcomes the difficulties of previous methods already discussed. In the example of ammonia, I can cool about 2000 tons per day of briquettes from about 1000 F. to about 250 F. by circulating about 45,00 pounds per hour of coolant. The coolant enters the cooling chamber at minus 40 F. and 15 p.s.i.g. and leaves as superheated vapor at 150 F. and 5 p.s.i.g.

I recognize that the substances I use as coolants decompose if heated to temperatures in the range of the temperature of the hot briquettes. However, in my cooling method little coolant actually reaches such temperatures. As liquid coolant contacts a hot briquette, the liquid immediately vaporizes and the vapors move away before reaching a temperature at which there is any marked decomposition. The briquette surfaces also cool rapidly to a temperature that does not cause decomposition. My tests further demonstrate that there is no appreciable decomposition and no chemical action on the briquettes. Hence I can accurately characterize my coolants as effectively stable and inert.

While I have shown and described certain preferred embodiments of my invention, it is apparent that other modifications may arise. Therefore, I do not wish to be limited to the disclosure set forth but only by the scope of the appended claims.

I claim:

1. A method of cooling briquettes of freshly reduced iron particles initially at a temperature of about 900 to 1300 F. comprising spraying the briquettes with a volatile liquid coolant which is of the group consisting of ammonia and low boiling hydrocarbons and is effectively stable and inert under the conditions encountered, thereby vaporizing most of the coolant and utilizing the heat required for its vaporization to assist in cooling the briquettes, recovering the vaporized coolant along with minor quantities of its decomposition products, separately recovering any unvaporized coolant, combining the vaporized and unvaporized coolants, liquefying the recovered coolant, purging the decomposition products, replacing lost coolant with fresh coolant, and re-using the coolant in the process, the cooled briquettes being at a temperature of about 200 to 300 F.

2. A method as defined in claim 1 in which the coolant is ammonia.

3. A method as defined in claim 1 in which the coolant is a low boiling hydrocarbon.

References Cited in the file of this patent

UNITED STATES PATENTS

| | | |
|---|---|---|
| 1,944,857 | Atwell | Jan. 23, 1934 |
| 2,337,008 | Vinther | Dec. 14, 1943 |

UNITED STATES PATENT OFFICE
CERTIFICATE OF CORRECTION

Patent No. 3,036,440                    May 29, 1962

Jerome Feinman

It is hereby certified that error appears in the above numbered patent requiring correction and that the said Letters Patent should read as corrected below.

Column 3, line 5, for "45,00" read -- 45,000 --.

Signed and sealed this 11th day of September 1962.

(SEAL)
Attest:

ERNEST W. SWIDER
Attesting Officer

DAVID L. LADD
Commissioner of Patents